United States Patent [19]

Friedrichs et al.

[11] 4,235,636
[45] Nov. 25, 1980

[54] PLASTIC REFRACTORIES WITH FUSED ALUMINA-CHROME GROG

[75] Inventors: James R. Friedrichs, Lansdale; Edward A. Snajdr, Exton, both of Pa.; Bela Klaudinyi, deceased, late of King of Prussia, Pa., by Lenke G. Klaudinyl, executrix

[73] Assignee: Combustion Engineering, Inc., Windsor, Conn.

[21] Appl. No.: 36,202

[22] Filed: May 4, 1979

[51] Int. Cl.$^3$ ............................................. C04B 35/42
[52] U.S. Cl. ...................................................... 106/66
[58] Field of Search .......................................... 106/66

[56] References Cited

U.S. PATENT DOCUMENTS

| 3,378,385 | 4/1968 | McCreight et al. | 106/66 |
| 3,888,687 | 6/1975 | Manigault | 106/66 |
| 3,945,839 | 3/1976 | Manigault | 106/66 |
| 4,039,344 | 8/1977 | Nishikawa et al. | 106/66 |

*Primary Examiner*—James Poer
*Attorney, Agent, or Firm*—Richard H. Berneike

[57] ABSTRACT

A high alumina, plastic refractory mixture containing 30 to 70 percent crushed fused alumina chrome grog, 10 to 30 percent glass industry grade chromite, 3 to 12 percent alumina, 2 to 6 percent bond clay and 3 to 18 percent of an acid phosphate binder.

5 Claims, No Drawings

PLASTIC REFRACTORIES WITH FUSED ALUMINA-CHROME GROG

BACKGROUND OF THE INVENTION

High alumina refractory materials have been modified in the past by the addition of chromic oxide usually in the form of chromite ($FeO.Cr_2O_3$). The chromic oxides produce increased corrosion resistance to molten metal and slag attack. However, conventional alumina-chromite refractories, which have a significant iron content as well as other constituents, exhibit positive volume changes which cause rupture, bloating and spalling.

SUMMARY OF THE INVENTION

The present invention uses a fused alumina-chrome grog in combination with a finely ground chromite without gangue or contaminating minerals. Also included are small quantities of calcined, tabular and/or fused alumina and bonding materials.

DESCRIPTION OF THE PREFERRED EMBODIMENTS

The refractory material of the present invention is a highly corrosion and erosion resistant plastic refractory which can be placed by conventional techniques such as ramming, gunning and vibrating to form monolithic shapes and linings. It is a refractory which is resistant to the high temperatures and to the attack of molten metals and their acid or semi-basic slags. It has a lower cost than the usual mixes containing an alumina-chrome solid solution bond and is suitable for such applications as industrial metallurgical furnaces, ladles and troughs. The plastic mixture of this invention contains the the following ingredients wherein the preferred composition is given as well as the permissible ranges:

| Component | Preferred Composition Weight % | Composition Range Weight |
|---|---|---|
| Fused alumina-chrome grog | 51.5% | 30–70% |
| Glass Industry Grade Chromite (−325 mesh) | 22.0 | 10–30 |
| Tabular alumina (−325 mesh) | 6.0 | |
| Calcined alumina (−325 mesh) | 6.0 | 3–12 |
| Fused alumina (−325 mesh) | 0.0 | |
| Bond clay | 4.0 | 2–6 |
| Acid phosphate binder | 6.5 | 3–18 |
| Water | 4.0 | 0–6 |

In the above table, the preferred composition contains 6 percent tabular and 6 percent calcined alumina but no fused alumina. The 3 to 12 percent figure for alumina in the composition range indicates that the alumina may be any one or any combination of the three types of alumina with the total alumina being in the 3 to 12 percent range.

A typical chemical composition of the preferred mix expressed on a calcined basis is as follows:

| Component | Weight % |
|---|---|
| $Al_2O_3$ | 59.2 |
| $SiO_2$ | 4.6 |
| $Fe_2O_3$ | 7.7 |
| MgO | 2.8 |
| CaO | 1.0 |
| $TiO_2$ | 0.1 |
| $Na_2O$ | 2.4 |
| MnO | 0.6 |
| $Cr_2O_3$ | 18.6 |
| $P_2O_5$ | 3.0 |
| | 100.0 |

Fused alumina-chrome grog is defined as a material produced by melting alumina bearing material and chromic oxide bearing material together. This forms an $Al_2O_3$-$Cr_2O_3$ solid solution which can have various phase contents. The composition of the fused alumina-chrome grog can vary. Following is the range of compositions:

| Component | Composition Range Weight % |
|---|---|
| $Al_2O_3$ | 24–97 |
| $Cr_2O_3$ | 3–48 |
| MgO | 0–12 |
| FeO | 0–22 |
| $SiO_2$ | 0–2 |
| Others | 0–5 |

The cooled, fused grog is crushed to the size range appropriate for the particular application. A typical screen analysis of the crushed grog expressed in U.S. Sieve Series Numbers is as follows:

| Particle Size | Weight % |
|---|---|
| −3 + 8 M | 13 |
| −8 + 20 | 28 |
| −20 + 70 | 17 |
| −70 + 140 | 22 |
| −140 | 20 |
| | 100% |

The crushed and sized fused alumina-chrome grog is then mixed with finely ground, glass industry grade chromite, preferably -325 mesh (less than 0.043 mm). Chromite is the naturally occurring oxide of ferrous iron and chromic oxide, $FeO.Cr_2O_3$, which is usually found in magnesium and iron rich igneous rocks. Glass industry grade chromite is chromite without gangue or contaminating materials. A typical composition range for glass industry grade chromite is as follows:

| Component | Composition Range Weight % |
|---|---|
| $Cr_2O_3$ | 45.0–47.0 |
| FeO | 19.0–21.0 |
| MgO | 9.0–11.0 |
| CaO | 0.0–1.0 |
| $SiO_2$ | 0.5–1.7 |
| MnO | 0.0–1.7 |
| $Al_2O_3$ | 10.0–17.0 |

Mixed with the grog and chromite is a quantity of alumina, either calcined, tabular or fused, or a mixture thereof. This alumina is also finely ground and preferably has a particle size of -325 mesh. The fine alumina and chromite particles form a solid solution upon firing to form the matrix and bond between the grog particles.

A particularly suitable bond clay for use in the invention is known as Ky#5 bond clay sold by Kentucky-Tennessee Clay Company, Inc., although any bond clay may be used. The bond clay and the acid phosphate liquid binder along with the fine alumina and chromite particles fill the voids between the grog aggregate and form a plastic mix having good flow properties in the green state. Also, it develops high strength when fired and exhibits limited shrinkage. Typical physical properties of fired bars at room temperature after having been fired at various temperatures are as follows:

| Firing Temp. °C. | Bulk Density ASTM C20 kg/dm$^3$ | Linear Change ASTM C179 % | Modulus of Rupture ASTM C491 MPa |
|---|---|---|---|
| 110 | 2.84 | −0.36 | 9.90 |
| 1094 | 2.88 | −0.25 | 9.65 |
| 1399 | 2.94 | −0.78 | 11.54 |
| 1683 | 2.99 | −2.39 | 20.63 |

The mix of the present invention can be placed by ramming to form monolithic installations or by vibrating into mold cavities to form free shapes or linings due to the excellent flow properties of the mix. This is due to the proper proportion of matrix, binder and bond clay. Also, a gunnable dry plastic mix can be formed. This is a mix in which the water is only added into the mix to form the plastic consistency during the gunning operation. The mix is therefore in a dry state and is stored as such.

The mixture of the present invention when tested for resistance to the corrosive and erosive effects of molten AISI 1020 Steel, pig iron and their slags in coreless induction furnaces showed high resistance to penetration and erosion.

What is claimed is:
1. A plastic refractory composition comprising:
 (a) from 30 to 70 percent of crushed fused alumina-chrome grog;
 (b) from 10 to 30 percent glass industry grade chromite;
 (c) from 3 to 12 percent alumina selected from the group consisting of calcined, tabular and fused alumina;
 (d) from 2 to 6 percent bond clay;
 (e) from 3 to 18 percent of an acid phosphate binder; and
 (f) from 0 to 6 percent water.
2. A plastic refractory composition as recited in claim 1 wherein said crushed fused alumina-chrome grog comprises from 24 to 97 percent alumina and from 3 to 48 percent chromic oxide.
3. A plastic refractory composition as recited in claims 1 or 2 comprising:
 (a) about 51.5 percent fused alumina-chrome grog;
 (b) about 22.0 percent glass industry grade chromite;
 (c) about 12 percent alumina;
 (d) about 4.0 percent bond clay;
 (e) about 6.5 percent acid phosphate binder; and
 (f) about 4.0 percent water.
4. A plastic refractory composition as recited in claims 1 or 2 wherein:
 (a) said glass industry grade chromite is minus 325 mesh;
 (b) said alumina is minus 325 mesh; and
 (c) about 80 percent of said grog has a size distribution from about minus 3 mesh to plus 140 mesh and the remaining grog is about minus 140 mesh.
5. A plastic refractory composition as recited in claim 3 wherein:
 (a) said glass industry grade chromite is minus 325 mesh;
 (b) said alumina is minus 325 mesh; and
 (c) about 80 percent of said grog has a size distribution from about minus 3 mesh to plus 140 mesh and the remaining grog is about minus 140 mesh.

* * * * *